United States Patent [19]

Morita

[11] 4,057,463
[45] Nov. 8, 1977

[54] METHOD OF OPERATING A NUCLEAR REACTOR WHICH MAINTAINS A SUBSTANTIALLY CONSTANT AXIAL POWER DISTRIBUTION PROFILE WITH CHANGES IN LOAD

[75] Inventor: Toshio Morita, Pittsburgh, Pa.

[73] Assignee: Westinghouse Electric Corporation, Pittsburgh, Pa.

[21] Appl. No.: 501,569

[22] Filed: Aug. 29, 1974

[51] Int. Cl.² .............................................. G21C 7/08
[52] U.S. Cl. ...................................... 176/22; 176/24; 176/36 R
[58] Field of Search ..................... 176/19, 20, 22, 24, 176/36

[56] References Cited

U.S. PATENT DOCUMENTS

| | | | |
|---|---|---|---|
| 3,222,254 | 12/1965 | Maldague et al. | 176/22 |
| 3,294,643 | 12/1966 | Guernsey | 176/22 |
| 3,380,889 | 4/1968 | Loose | 176/22 |
| 3,565,760 | 2/1971 | Parkos et al. | 176/24 |
| 3,625,816 | 12/1971 | Aleite et al. | 176/36 R |

OTHER PUBLICATIONS

"Nuclear Reactor Theory", Lamarsh (1966) Addison-Wesley, New York, p. 478.

Primary Examiner—Samuel W. Engle
Assistant Examiner—S. A. Cangialosi
Attorney, Agent, or Firm—D. C. Abeles; Z. L. Dermer

[57] ABSTRACT

This invention provides a method of operating a nuclear reactor with the object of maintaining a substantially symmetric axial xenon distribution during normal power operation including load follow. Variations in the xenon distribution are controlled by maintaining a substantially symmetric axial power distribution. Procedures are described for maintaining the axial offset value of the core, as an indicia of the axial power distribution, substantially equal to a target value, which is modified periodically to account for core burnup. In one embodiment a neutron absorbing element within the core coolant, or moderator, is employed to assist control of reactivity changes associated with changes in power with the full length control rods mainly employed to adjust variations in the axial power distribution, while the part length rods remain completely withdrawn from the fuel region of the core. In a second embodiment reactivity changes associated with changes in power are controlled by the full length rods, while the part length rods are used to adjust the axial power distribution and the neutron absorbing element within the core coolant or moderator is used to compensate for xenon buildup or depletion.

16 Claims, 20 Drawing Figures

NORMAL DISTRIBUTION

METHOD OF OPERATING A NUCLEAR REACTOR WHICH MAINTAINS A SUBSTANTIALLY CONSTANT AXIAL POWER DISTRIBUTION PROFILE WITH CHANGES IN LOAD

BACKGROUND OF THE INVENTION

This invention pertains generally to the control of core operation of a nuclear reactor and more particularly to the control of the axial power distribution within the core.

Generally nuclear reactors contain a reactive region commonly referred to as the core in which sustained fission reactions occur to generate heat. The core includes a plurality of elongated fuel rods comprising fissile material, positioned in assemblies and arranged in a prescribed geometry governed by the physics of the nuclear reaction. Neutrons bombarding the fissile material promote the fissionable reaction which in turn releases additional neutrons to maintain a sustained process. The heat generated in the core is carried away by a cooling medium, which circulates among the fuel assemblies and is conveyed to heat exchangers which in turn produce steam for the production of electricity.

Commonly in pressurized water reactors a neutron absorbing element is included within the cooling medium (which also functions as a moderator) in controlled variable concentrations to modify the reactivity and thus the heat generated within the core, when required. In addition, control rods are interspersed among the fuel assemblies, longitudinally movable axially within the core, to control the cores reactivity and thus its power output. There are three types of control rods that are employed for various purposes. Full length rods, which extend in length to at least the axial height of the core, are normally employed for reactivity control. Part length control rods, which have an axial length substantially less than the height of the core, are normally used for axial power distribution control. In addition, reactor shutdown control rods are provided for ceasing the sustained fissionable reaction within the core and shutting down the reactor. The part length rods and full length control rods are arranged to be incrementally movable into and out of the core to obtain the degree of control desired.

As a byproduct of the fissionable reaction, through a process of beta decay of radioactive iodine, xenon is created. Xenon has the property of having a large neutron absorption cross section and therefore has a significant effect on the power distribution within the core and reactivity control. While the other forms of reactivity management are directly responsive to control, the xenon concentration within the core creates serious problems in reactor control in that it exhibits a relatively long delay period and requires up to at least twenty hours after a power change to reach a steady-state value.

While the radial power distribution of the core is fairly uniform, due to the prescribed arrangement of fuel assemblies and the positioning of control rods which are symmetrically situated radially throughout the core, the axial power distribution can vary greatly during reactor operation. Core axial power distribution has created many problems throughout the history of reactor operations for many reasons. Normally coolant flow through the fuel assemblies is directed from a lower portion of the core to the upper core regions, resulting in a temperature gradient axially along the core. Changes in the rate of the fissionable reaction, which is temperature dependent, will thus vary the axial power distribution. Secondly, the axial variation in the power distribution varies the xenon axial distribution, which further accentuates the variations in power axially along the core. Thirdly, insertion of the control rods from the top of the core, without proper consideration of the past operating history of the reactor can add to the axial power asymmetry.

The change in reactor core power output which is required to accommodate a change in electrical output of an electrical generating plant is commonly referred to as load follow. One load follow control program currently recommended by reactor vendors utilizes the movement of the full length control rods for power level increases and decreases and the part length control rods to control axial oscillations and shape the axial power profile. Changes in reactivity associated with changes in the xenon concentration are generally compensated for by corresponding changes in the concentration of the neutron absorbing element within core coolant or moderator. In this mode of operation the part length rods are moved to maintain the axial offset within some required band, typically plus or minus 15%. The axial offset is a useful parameter for measuring the axial power distribution and is defined as:

$$A.O. = (P_t - P_b)/(P_t + P_b)$$

where $P_t$ and $P_b$ denotes the fraction of power generated in the top half and the bottom half of the core respectively. No effort is made to maintain the inherent core axial power profile. The part length rods are moved to minimize and reduce the axial offset independent of the previously established steady-state axial offset. This process induces a constant fluctuation of the axial offset during sustained load follow operations which result in a number of undesirable operating conditions. For one thing power pinching, which is a large axially centered power peak, is likely to occur. Such power peaks result in a reactor power penalty which requires the reactor to be operated at a reduced level so that such peaks do not exceed specified magnitudes. Secondly, severe changes occur in the axial power profile of a transient nature during large load changes due to heavy insertion of control rods at reduced power levels. Thirdly, large xenon transients occur upon coming back to power resulting in occurrences such as axial power oscillations. Fourthly, the part length rod broad operating instructions are generally vague and require anticipation and interpretation by the reactor plant operator. Fifthly, increased hot channel factors result (which are hot spots which occur within the cooling channels among the fuel assemblies) and require reductions in the power rating of the reactor to accommodate these severe transients and/or adverse power profiles. Finally, no protection currently exists against severe pinching with small axial offsets.

Due to the many adverse operating conditions experienced in operating a nuclear reactor during load follow many reactor vendors recommend operating the reactor at a constant power output without a load follow capability.

Accordingly, a new method of operating a nuclear reactor is desired that will have a load follow capability without exhibiting the adverse operating conditions described above, thereby avoiding the necessity of imposing power penalties to compensate for axial power peaks.

SUMMARY OF THE INVENTION

Briefly, the method of this invention avoids the adverse operating characteristics experienced in the operation of a nuclear reactor according to prior practice by maintaining a substantially symmetric xenon axial profile. Implementation of the desired xenon distribution is obtained by monitoring the power generated in the core at a first and second axial location. The corepower parameters measured at the two locations are computed in accordance with a predetermined relationship to give a value indicative of the axial power distribution of the core. The reactivity control mechanisms of the reactor are manipulated in accordance with the monitored values to maintain a substantially symmetric axial power distribution within the core throughout reactor core operation including changes in reactor power output.

Two separate embodiments are described which have the capability of complementing each other. In the first, the part length control rods remain withdrawn from the core while the neutron absorbing element within the core coolant or moderator is employed to assist adjusting the reactivity of the core associated with power changes and the full length control rods are manipulated to maintain the desired axial power profile. In the second embodiment the full length control rods are used to control the reactivity changes associated with changes in power in the core and the part length rods are employed to control the axial power distribution while the neutron absorbing element within the coolant or moderator compensates for reactivity changes due to xenon buildup or depletion. Each embodiment is capable of implementing the concepts of this invention and each has its respective distinct advantages.

BRIEF DESCRIPTION OF THE DRAWINGS

For a better understanding of the invention, reference may be had to the preferred embodiment, exemplarly of the invention, shown in the accompanying drawings, in which.

DESCRIPTION OF THE PREFERRED EMBODIMENT

Figure 1:
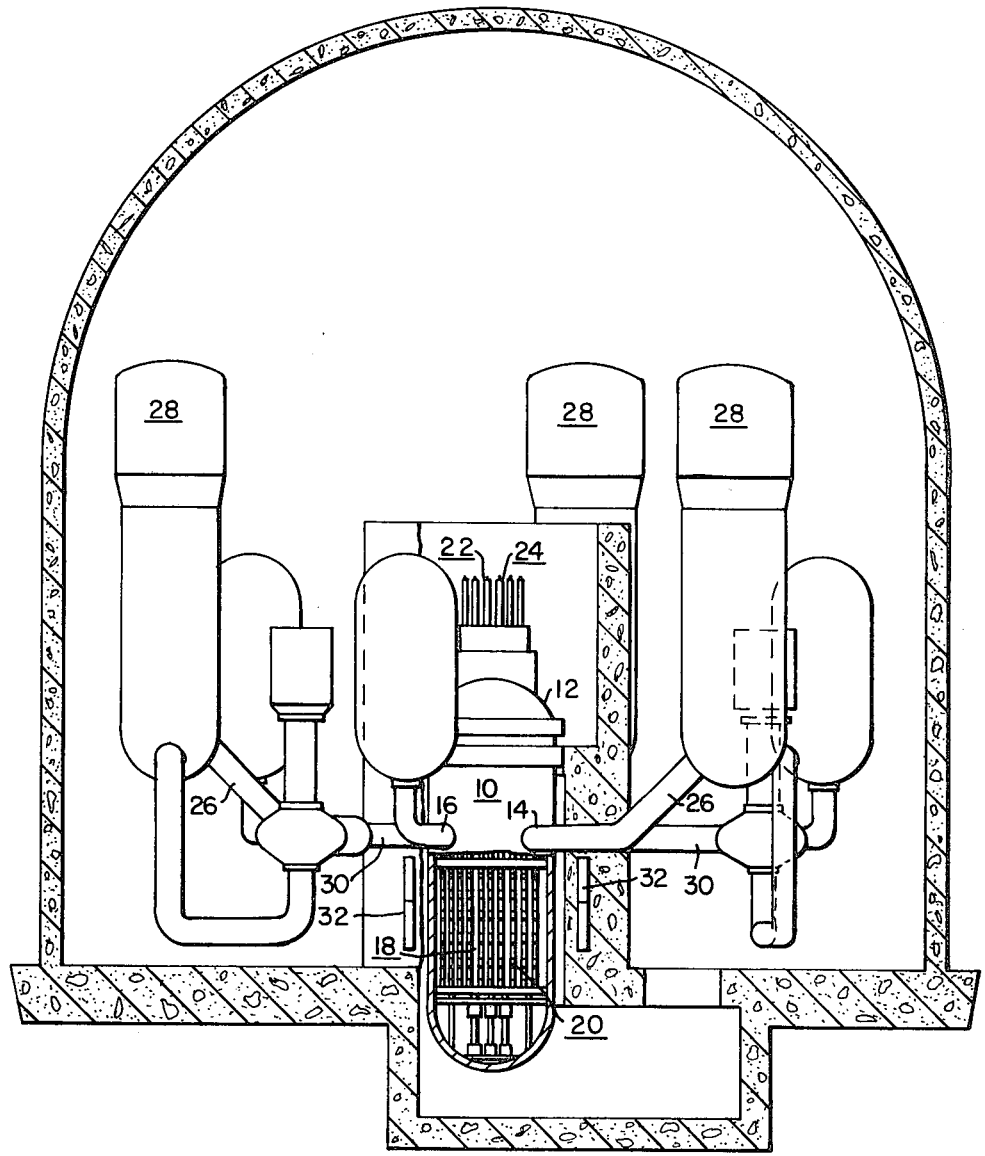
FIG. 1 is a schematic view of a nuclear reactor.
Figure 2:
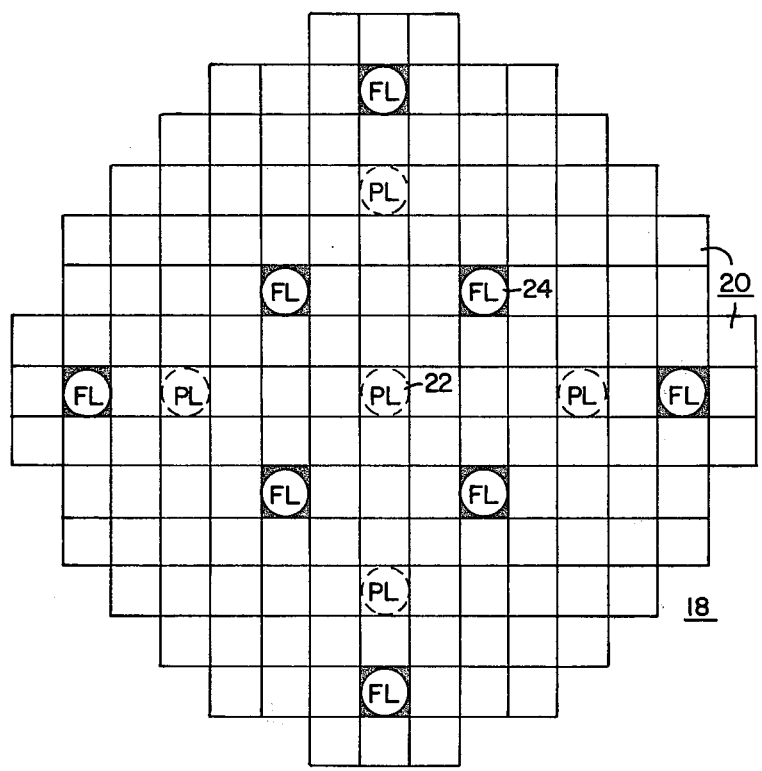
FIG. 2 is a plan view of a reactor core showing the fuel assembly and full length and part length control rod locations.
Figure 3B:
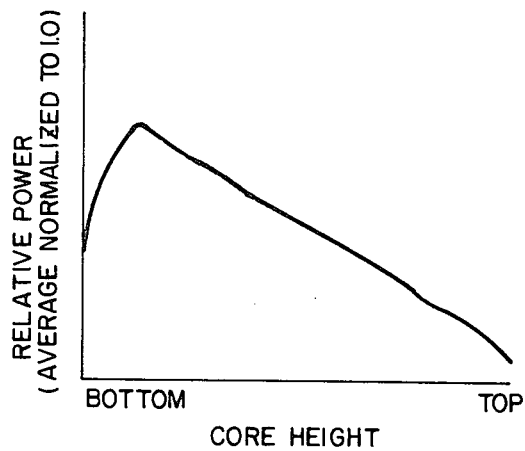
FIGS. 3A, 3B, 3C, 3D, and 3E are graphical representations of important parameters effecting the axial power distribution which respectively show exemplary curves for a reference normal power distribution, and variations from the normal power distribution caused by control rod insertion, a power level change, burnup history and xenon redistribution.
Figure 3C:
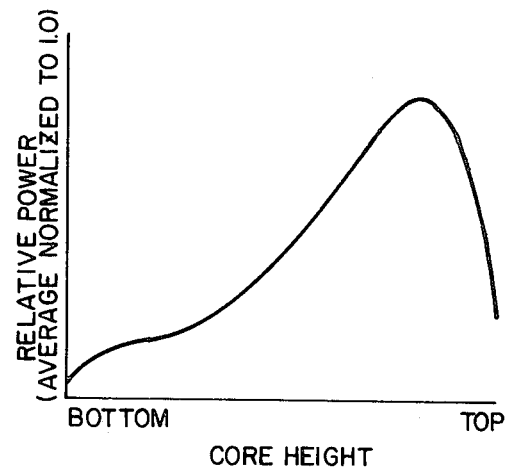
Figure 3A:
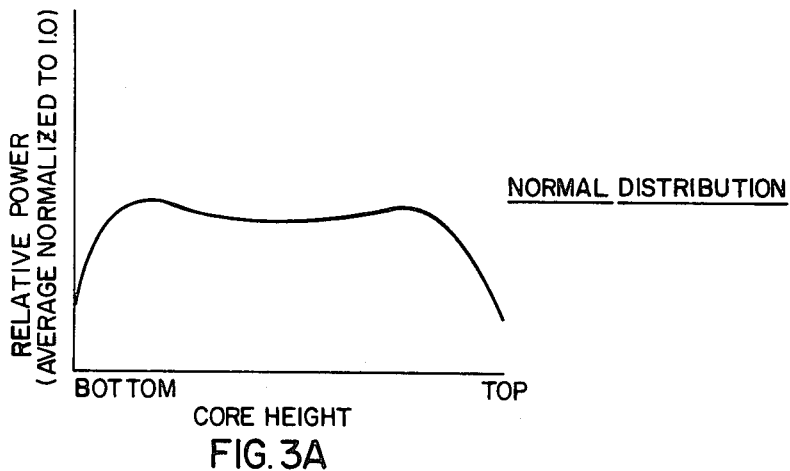
Figure 3D:
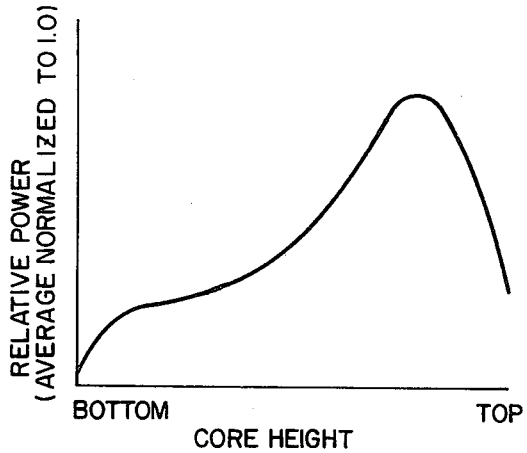
Figure 3E:
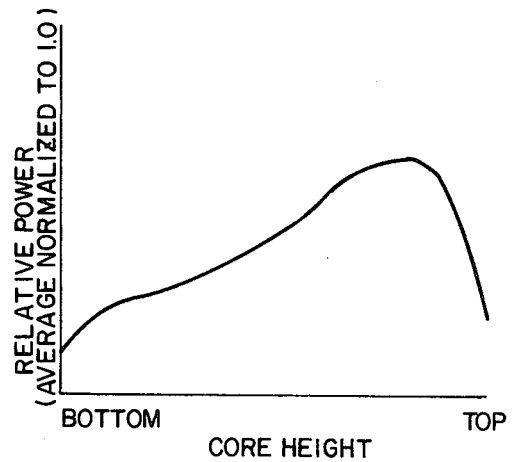

FIG. 1 shows a schematic representation of a typical pressurized water reactor which can employ the method of this invention to avoid the operating difficulties experienced by the prior art. The reactor of FIG. 1 includes a vessel 10 which forms a pressurized container when sealed by its head assembly 12. The vessel has coolant flow inlet means 16 and coolant flow outlet means 14 formed integral with and through its cylindrical walls. As is known in the art, the vessel 10 contains a nuclear core 18 of the type previously described and more specifically illustrated in FIG. 2, consisting mainly of a plurality of clad nuclear fuel elements 20 which generate substantial amounts of heat depending primarily upon the position of the part length 22 and full length 24 control rods previously described. The heat generated by the reactor core 18 is conveyed from the core by coolant flow entering through inlet means 16 and exiting through outlet means 14. Generally the flow exiting through outlet means 14 is conveyed through an outlet conduit 26 to a heat exchange steam generator system 28, wherein the heated coolant flow is conveyed through tubes which are in heat exchange relationship with water which is utilized to produce steam. The steam produced by the generator is commonly utilized to drive a turbine for the production of electricity. The flow of the coolant is conveyed from the steam generator 28 through a cool leg conduit 30 to inlet means 16. Thus a closed recycling primary of steam generating loop is provided with the coolant piping coupling the vessel 10 and the steam generator 28. The vessel illustrated in FIG. 1 is adaptable for three such closed fluid flow systems or loops, though, it should be understood that the number of such loops vary from plant to plant and commonly 2, 3, or 4 are employed.

Figure 4:
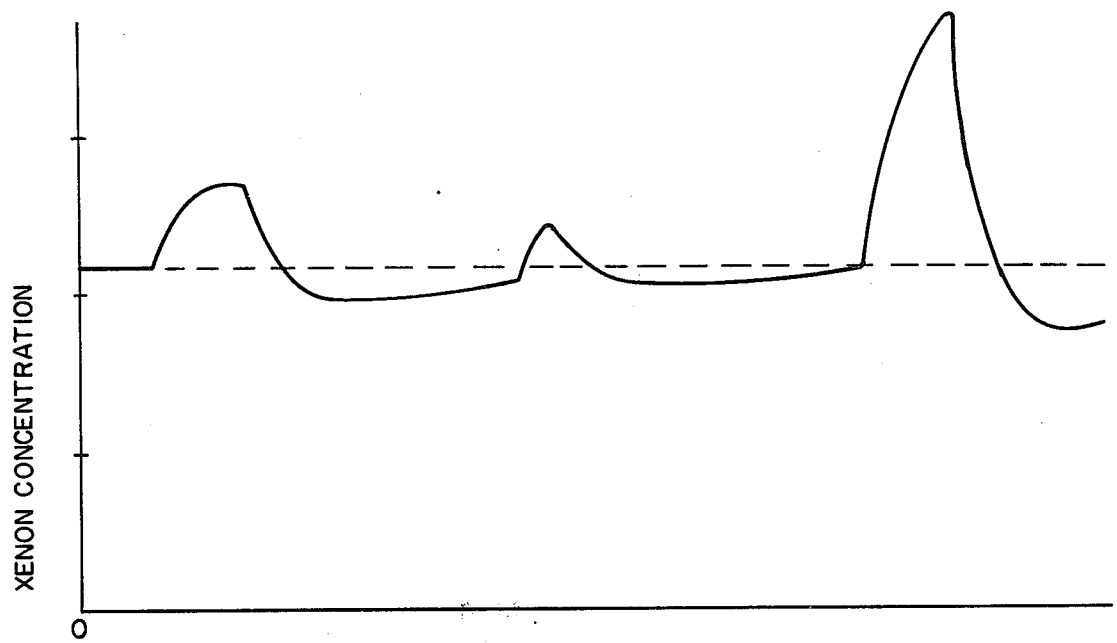
FIGS. 4A and 4B respectively show graphical respresentations of xenon concentration changes (FIG. 4A) corresponding to given power changes (FIG. 4B)
Figure 4:
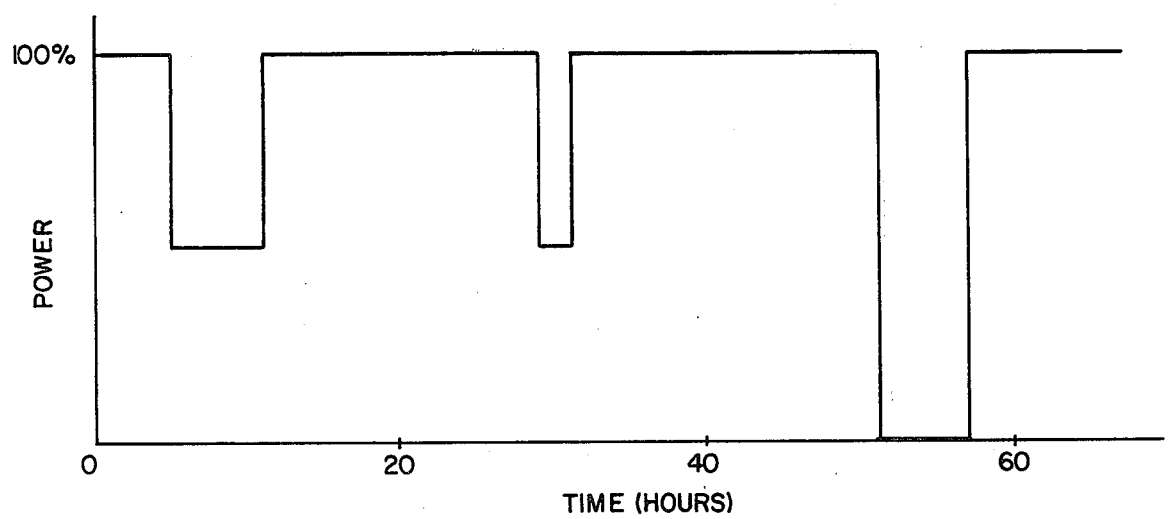

In the production of thermal power within the core important parameters effecting the axial power distribution, as previously explained, are the level of control rod insertion of both the full length or part length rods, the burn-up history of the core, the power level of the reactor and the xenon distribution. FIGS. 3A, 3B, 3C, 3D and 3E show the sensitivity of the power distribution to each of these parameters. The xenon distribution at any time is a result of the operating history for at least the previous twenty hours. Therefore, in order to obtain the xenon distribution, a precise trace of the power history is necessary. An example of the xenon concentration change during an exemplary power change is illustrated in FIGS. 4A and 4B. From the graphical representation it is apparent that xenon concentration changes exponentially in a direction inverse to that of the corresponding power change. Thus it can be appreciated that due to the exponential decay of the xenon concentration the resultant neutron absorption effect will be cumulatively dependent upon the overall operating history of the reactor.

Figure 5:
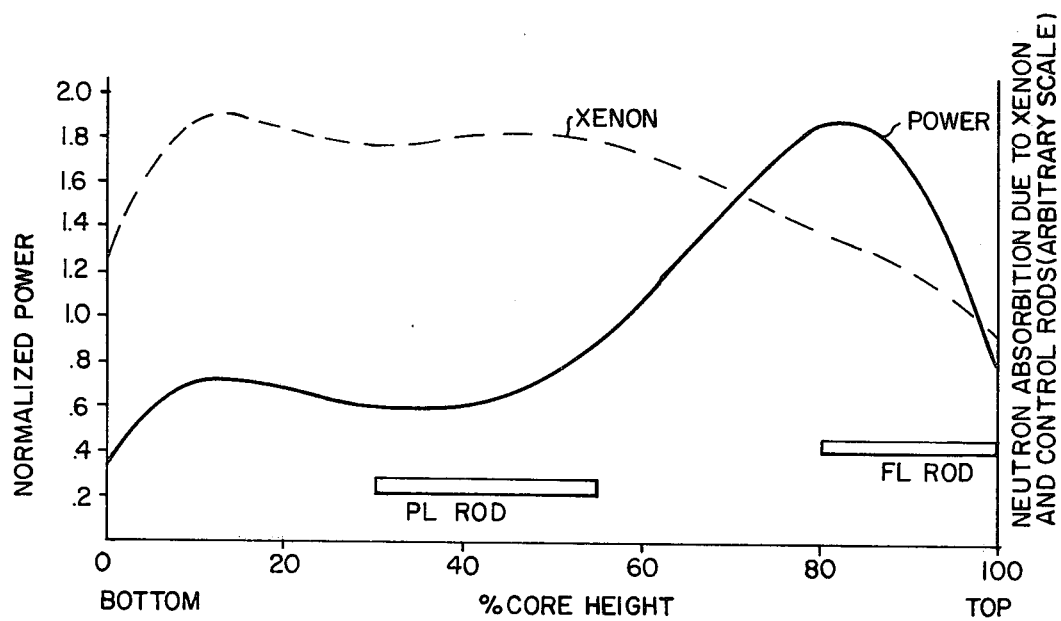
FIG. 5 is a graphical representation of the axial power distribution corresponding to a given xenon distribution and control rod insertion.

FIG. 5 illustrates an exemplary axial power distribution and corresponding xenon distribution for the indicated control rod insertion and a given core power history. Xenon and control rod insertion are plotted proportional to their neutron absorptions. From the graphical representation provided in FIG. 5 it is apparent that the neutron absorption capability of the control rod group is about a quarter of the neutron absorption capability of the xenon present in the core. This means that once the xenon distribution is destroyed, i.e., skewed as shown in the upper core section illustrated in FIG. 5, which normally occurs as a result of a past skewed power distribution, the part length rods are not necessarily strong enough to obtain the desired power distribution. Therefore, in order to assure the lowest power peaking factor, which is the lowest power linear density, so as to avoid power penalties, it is desirable to maintain the power distribution as symmetric as possible during plant operation, including changes in load.

As previously mentioned the axial offset is a useful parameter for monitoring the axial power distribution within the core. In accordance with the invention, if the core is operated so as to maintain the axial offset at a constant value, the power generation will always be balanced between the top and bottom parts of the core, resulting in a symmetric axial xenon distribution. This eliminates the creation of a skewed xenon distribution having a second harmonic component, which causes skewness of the power distribution and is relatively slow to decay.

Reactors of the type illustrated in FIG. 1 generally include two section excore detectors 32 positioned around the periphery of the reactor vessel 10 coextensive with the axial length of the core 18, which provide complete information on the axial offset. The detectors give the flux difference, Delta I, which is defined as:

Delta I = $P_T - P_B$

The correspondence between the axial offset and the flux difference can be expressed as:

Axial Offset = Delta I/P where P denotes the relative power of the reactor.

The method of this invention requires that the axial offset be maintained at a constant predetermined target value, or alternatively, within a narrow band around this target value. Preferably, the target axial offset is measured at full power, equilibrium xenon, with all control rods out of the fuel region of the core. This is the most stable axial distribution and most flux oscillations if there are any move around this distribution.

Figure 6:
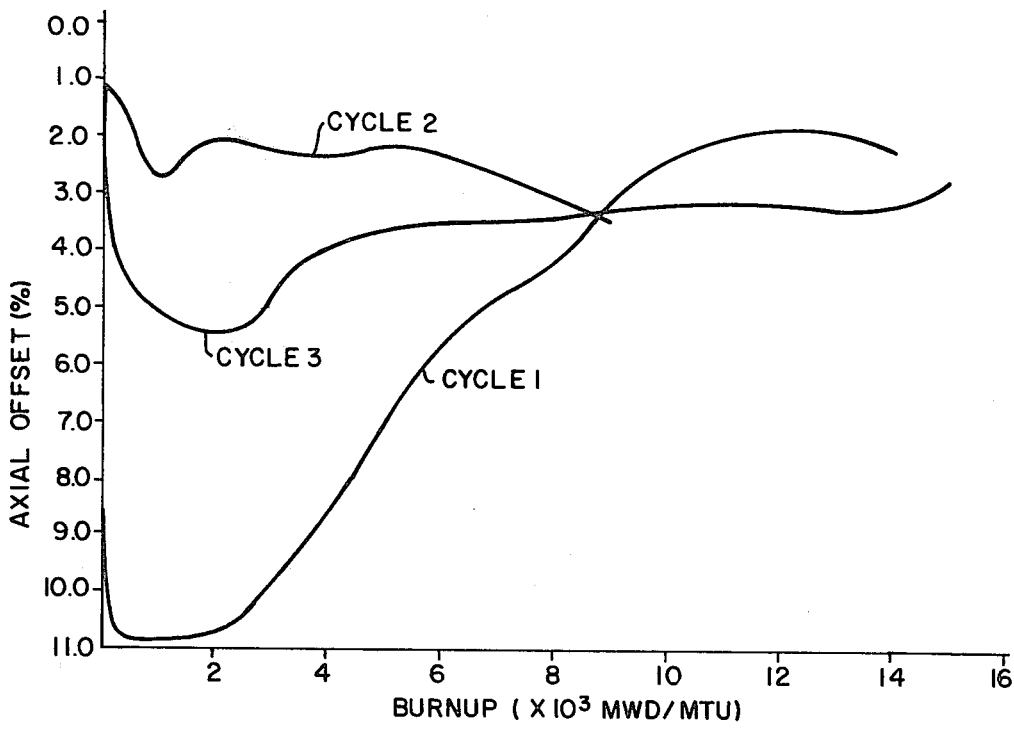
FIG. 6 is a graphical illustration of the typical behavior of the axial offset for various fuel cycles.

The target axial offset will vary slowly as a function of fuel depletion, commonly referred to as fuel burnup. FIG. 6 shows variations in the axial offset for various fuel cycles. Therefore, it is desirable to remeasure the axial offset target value periodically to compensate for fuel depletion. Desirably this is accomplished by updating the target axial offset value every equivalent full power month by measuring the axial offset at full power with equilibrium xenon with all control rods out of the reactive region of the core. This updating procedure by measurement assures that the axial power distribution is maintained in the most stable condition during load follow operations. Again this procedure is implemented by employing the outputs of the excore detectors to calculate the axial offset value.

In accordance with one mode of operation of this invention, constant axial offset operation is obtained without the use of part length rods. A power reduction always tends to move axial offset in a positive direction because of the negative moderator temperature coefficient, which results in greater reactivity at the top of the core. Therefore, the proper amount of full length rod insertion helps move the axial offset back to the original target value. In this mode, the full length rods are used for two purposes, to absorb the reactivity associated with a power reduction and to maintain the axial offset at its original value. The prime factor in determining the full length rod insertion is axial offset control, not reactivity control. Therefore, full length rod insertion is usually not enough to control the reactivity change associated with a power reduction. The balance of the reactivity has to be controlled through changes in the neutron absorbing element within the moderator or coolant medium. Generally, in pressurized water reactors, where water is circulated as the coolant medium, a solution of boron within the water is employed as the neutron absorbing element.

Figure 7A:
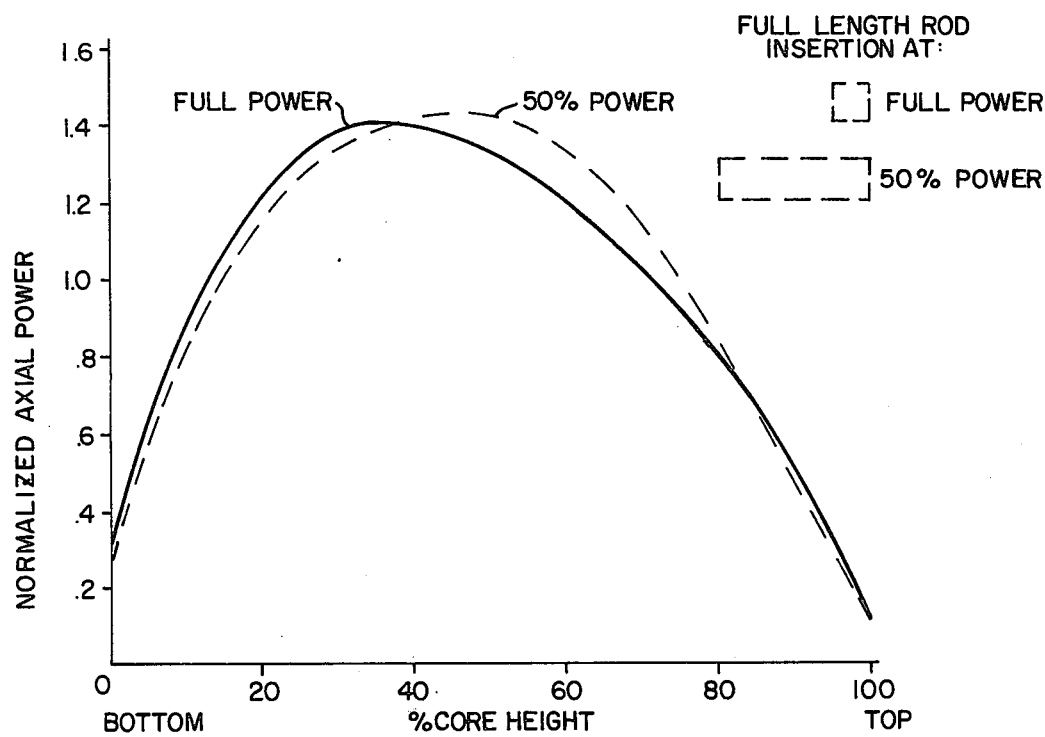
FIGS. 7A and 7B respectively show a comparison of the relative axial power distribution at full power and at 50% power for beginning of life operation (FIG. 7A) and end of life operation (FIG. 7B) without use of part length rods.
Figure 7B:
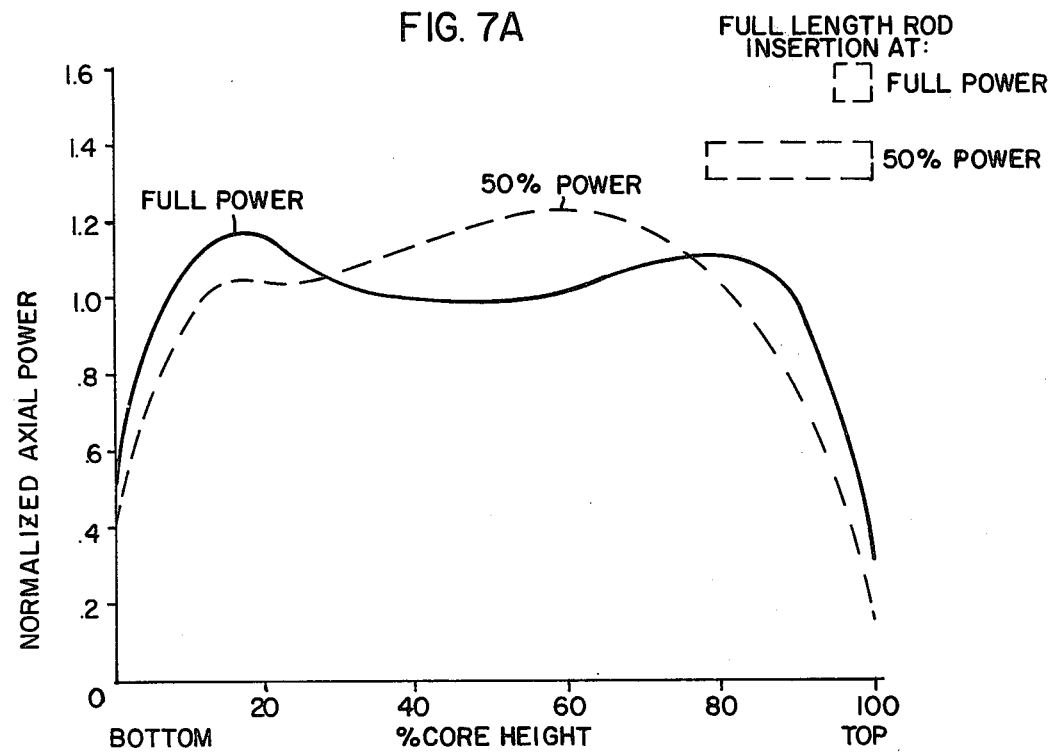

In this mode of operation it should be remembered that the part length rods are fully withdrawn from the core at all times. By proper deployment of the full length rods it is possible to preserve the power distribution throughout a load change operation with the excess overall reactivity control associated with the power change being taken up by the boron system. The success of this type of operation can better be appreciated by reference to FIGS. 7A and 7B which compare exemplary power distributions at full power and at 50% power for both beginning of life (FIG. 7A) and end of life (FIG. 7B) operation. This mode of operation has many advantages for fuel integrity as will be appreciated from following discussions. A minor drawback to this mode of operation is that there is some difficulty experienced in changing the reactor power at a relatively fast rate, because the reactivity change depends on the boron system to some extent. This is especially noticeable when quick return to full power operation is required. The full length rod insertion during part power operation is not enough to give the required reactivity to return to full power and boron dilution is necessary. Though, if a fast boron dilution system is employed this difficulty can be overcome. Another alternative for faster response to load follow is provided by the following alternative mode of operation which employs part length rods.

Figure 8A:
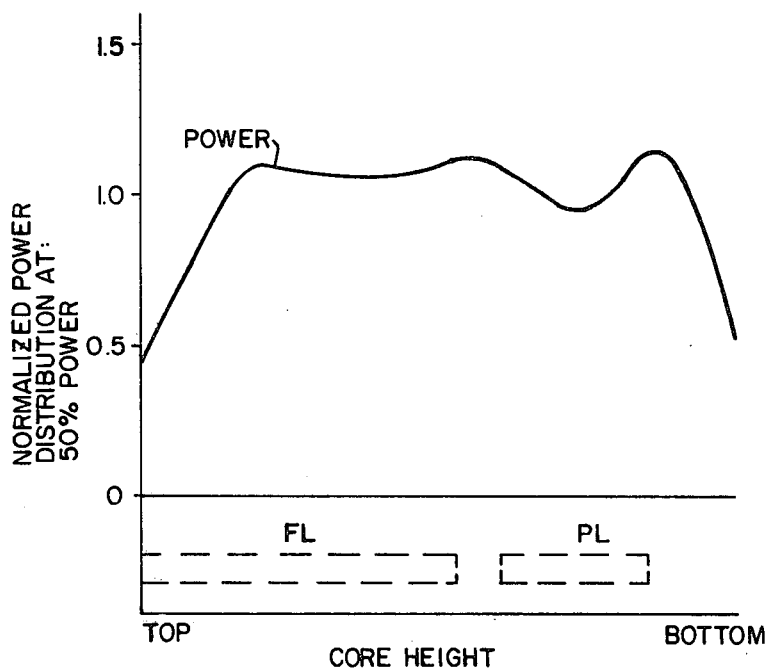
FIGS. 8A and 8B are graphical illustrations of typical control rod insertions and the corresponding power distribution during operation employing part length control rods at 50% power (FIG. 8A) and full power (FIG. 8B)
Figure 8B:
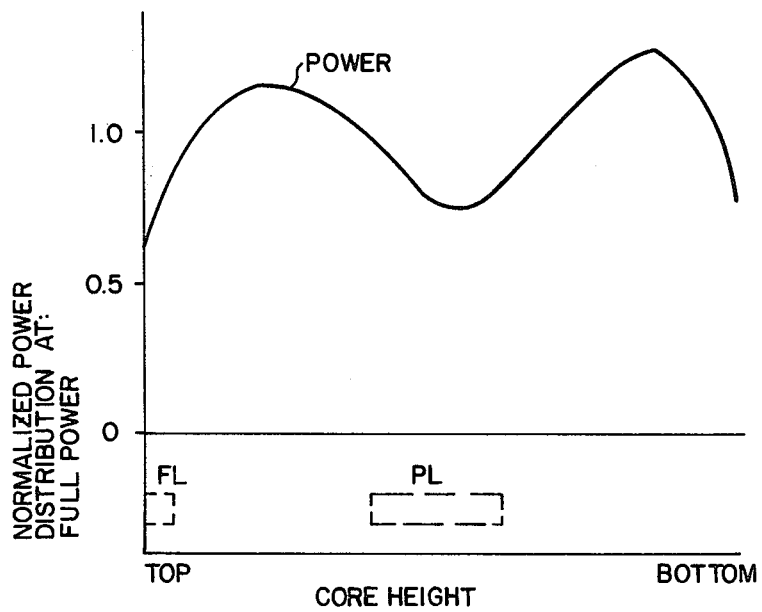

A second mode of operation contemplated by this invention employs part length rods for axial power distribution control. In order to assure the spinning reserve capacity, which is the difference between the full power rating an the current rating that can be counted upon in the event of a sudden large demand in power, the full length rods in this mode of operation should be inserted much deeper than required in the operation without part length rods. This deep insertion of full length rods makes the axial offset strongly negative and results in a skewed xenon distribution. A balanced power distribution is obtained by putting the part length rods in the bottom of the core, as shown in FIG. 8A. In the case of a return to full power, the full length rods are removed from the core to provide a reactivity increase, then the part length rods are moved to the center of the core to preserve the axial offset at its original value as will be appreciated by referring to the full power and 50% power graphical representations provided in FIGS. 8B and 8A respectively. These two power distributions have the same axial offset. The main difference between the two distributions is the third harmonic of the xenon distribution, which decays quickly without harmful effects.

Thus, in this mode of operation, the full length rods are used for the reactivity control associated with the power change, and the part length rods are employed for axial offset control. The reactivity change due to xenon buildup or depletion is controlled by the boron system.

In operation with part length rods the full length rod insertion is searched to give enough reactivity to return to full power when withdrawn from the core region with the part length rods moved to the center of the core. It should be appreciated that full length rod insertion varies almost linearly as a function of power and will remain at a given insertion level when the desired power level is achieved. This is mainly because the xenon distribution and integral rod worth are perceived well during part power operation.

Constant axial offset operation with part length rods provides low peaking and stable power distribution throughout load follow operation with the capability of responding to any sudden power damand upon request.

Figure 9:
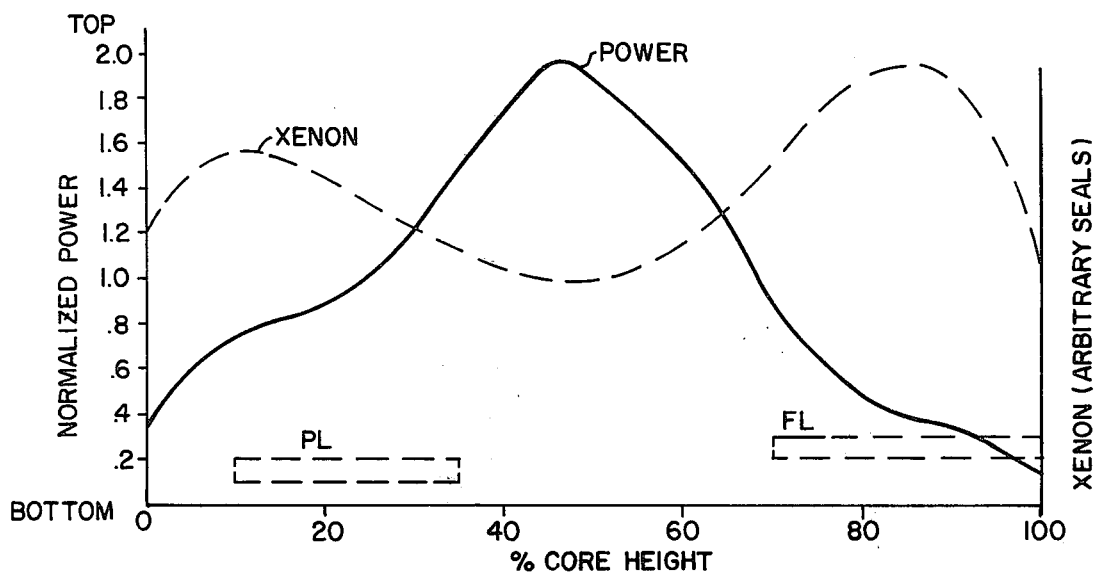
FIG. 9 is a graphical example of a pinched power distribution.
Figure 10:
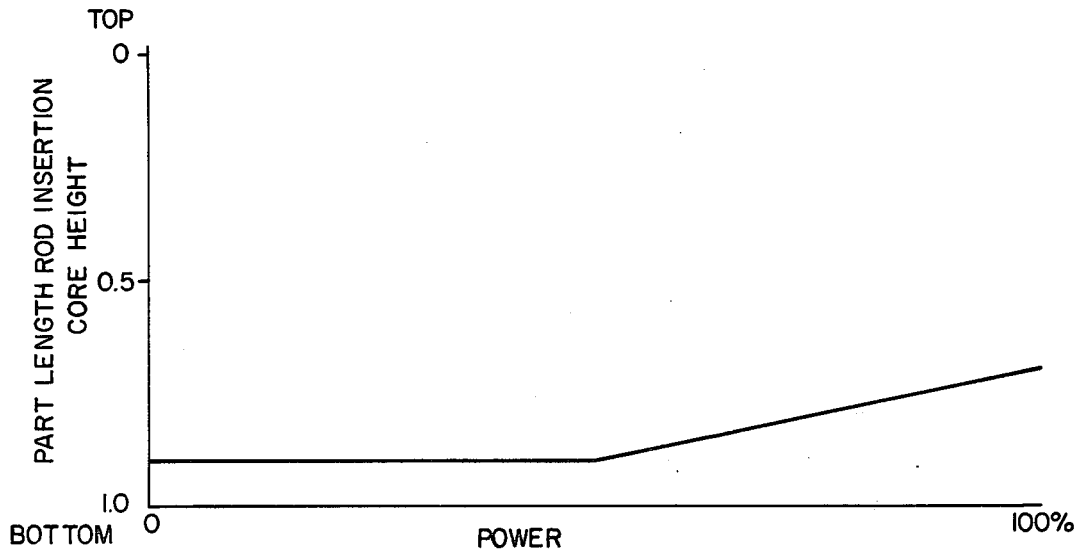
FIG. 10 is a graphical representation of the insertion limits of the part length control rods.

During constant axial offset operation at full power the part length rods are normally maintained around the center of the core while at part power the part length rods are generally positioned around the bottom of the core. Deeper part length rod insertion will correspond to lower reactor power levels. In this respect the part length rods are a very flexible tool for axial power distribution control. However, some caution is necessary in their use. The main drawback of the part length rods is that full length rod insertion coincident with the part length rods at the bottom of the core sometimes "pinches" the axial power distribution. This distribution has a small axial offset, but a high power peak around the center core location as illustrated in FIG. 9. The current two section excore detectors are not capable of distinguishing between a normal power distribution and a pinched distribution. A pinched power distribution is usually acceptable during part power operation, since the power peak is generally below acceptable power limits, but not during full power operation due to the magnitude of the power peak, which if not reduced will result in a power penalty. According to the modes of operation of this invention, deep insertion of the part length rods is only required during part power operation. Therefore, it is advisable to prohibit deep part length insertion during full power operation in order to avoid the possibility of a pinched power distribution. FIG. 10 shows that part length rod insertion should be limited to approximately 70% insertion at full power and linearly increased to approximately 90% insertion at 50% power. Any part length rod insertion beyond 90% decreases the effect of the part length rods because of the small amount of power in the extreme lower region of the core.

Figure 11:
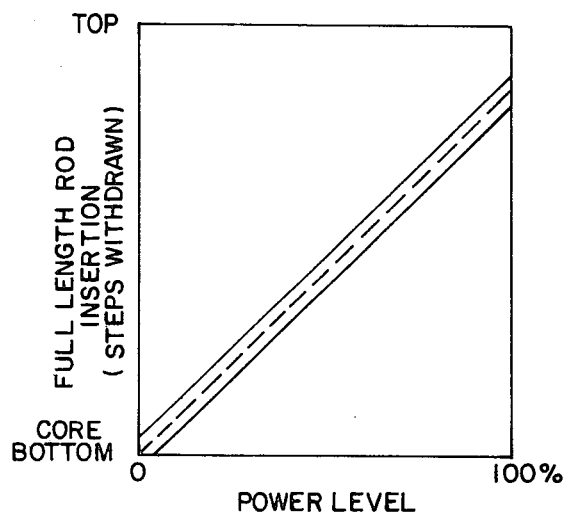
FIG. 11 is a graphical example of the full length control rod insertion target for maintaining a spinning reserve capability.

Full length rod insertion during operation with part length rods is defined to give a reactor a spinning reserve capability, assuming simultaneous movement of the part length rods for constant axial offset control. The required full length insertion is a function of the reactor power providing axial offset control is achieved. FIG. 11 shows a typical full length rod insertion line to maintain a spinning reserve capability. This insertion line is normally referred to as the full length rod target insertion line, and is a function of the plant power defect, which is the reactivity difference associated with a power change. In practicing the modes of operation of this invention reactor operators are required to keep full length rod insertion along this line as much as possible.

Deviations from the target insertion results in diminishing the plants performance. For example, if the full length rods are kept above the target line the spinning reserved capability will be limited. Because of inadequate full length rod insertion, the reactivity associated with full length rod withdrawal will not be enough to bring the reactor to full power. Additional dilution will be required within the boron system to obtain the desired power limit. However, this limitation is not safety related. As another example, if the full length rods are maintained below the target line in the case of a return to full power the reactor will become critical with a relatively deep rod insertion. This requires the part length rods to be moved to the bottom of the core for constant axial offset control. As discussed previously part length rod insertion during full power is limited to 70% to avoid a pinched power distribution. Consequently, the power distribution tends to shift to the bottom of the core and could result in a high peaking factor. This will be detected by the excore axial offset measurement and will necessitate a power reduction.

The best constant axial offset load follow operation is achieved only when:

i. the part length rod worth, when calculated on a full length rod basis, is equal or slightly greater than the full length rod worth; and ii. the boron system has enough capability to compensate for the reactivity change associated with xenon buildup or depletion. Full length rod withdrawal above the target line is a remedy for this condition at the expense of the spinning reserve capability.

When the part length rod worth calculated on the basis of full length rod length, is smaller than the full length rod worth, the axial offset will become heavily negative during part power operation with full length rod insertion maintained just enough to keep the spinning reserve capability. Under these conditions the axial offset will shift as negative as minus 30% during part power operation. Thus a skewed power distribution is formed which destroys the desired xenon distribution. When the reactor returns to full power, high peaking is created in the bottom of the core. This problem is solved by allowing the full length rods to withdraw to maintain the axial offset at a constant value. However, this operation sacrifices the spinning reserve capability. The full length rod insertions are 60% for the spinning reserve capability and 40% for constant axially offset control. The difference in full length rod insertion is related to the penalty in the spinning reserve capability.

The boron system has to be designed to have the dilution capability to offset changes in reactivity associated with xenon buildup or depletion. The dilution capability of the boron system depends on the boron concentration within the core. The higher boron concentration, the greater the dilution capability. As the core approaches the end of cycle life, boron concentration becomes less and the dilution process becomes more difficult. Full length rod insertion is determined for the spinning reserve capability from the scheduled power. However, because of this lack of dilution capability, which is required after power reduction to compensate for xenon buildup, the reactor power cannot be maintained at the scheduled level but is subject to further reduction. Full length rod withdrawal from the target line removes this problem, once again at the expense of the spinning reserve capability. It should be noted that the full length rod withdrawal above the target line is always favorable from the viewpoint of axial offset control, thus assuring low peaking factor operation. Of course, proper design of the boron system in anticipation of implementing the concepts of this invention will avoid such difficulties.

In order to keep the axial offset at a constant value at all times, continuous operator attention and corrective action, such as part length rod and boron system maneuvering is necessary. However, experimental results show that some flexibility is possible without destroying the symmetry of the axial xenon distribution. Analytical results show that one hour idle operation generally gives quite stable behavior during load follow. However, care should be taken not to be idle just after a return to full power. Accordingly, with the precaution noted for after a return to full power, a one hour violation of axial offset control will still be acceptable.

The target axial offset as previously defined for constant axial offset control is the axial offset at full power, equilibrium xenon, with all control rods out of the fuel region of the core. In actual operation, some allowance is necessary for control flexibility. Experimental studies have been made to determine what deviations from the target axial offset are allowable without losing the merits of constant axial offset control.

Figure 12A:
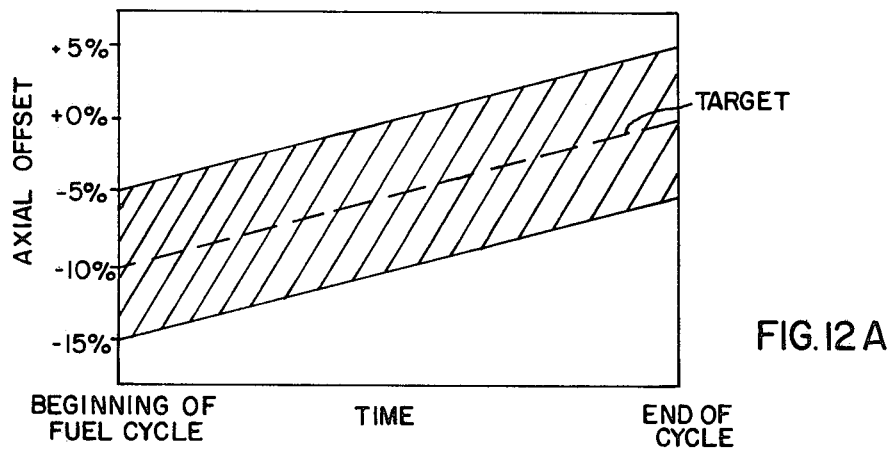
FIGS. 12A and 12B are graphical representations of an allowed axial offset band of operation (FIG. 12A) and the corresponding flux difference band (FIG. 12B).
Figure 12B:
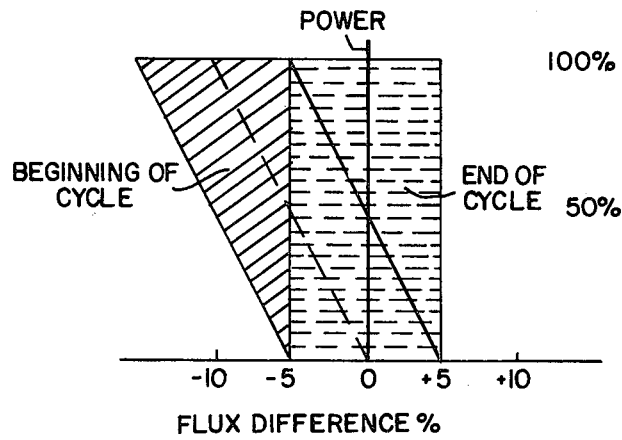

Based on previous reactor operating experience, at lower power levels a larger axial offset deviation is permitted than at higher power levels from the viewpoint of minimizing $F_z$ (axial peaking factor) at full power. By taking advantage of the measured flux difference, an allowable axial offset band can be defined as a constant delta I band. Accordingly, the allowable axial offset deviation is inversely proportional to the power level. FIG. 12A shows the axial offset band as the function of burnup corresponding to a constant delta I band illustrated in FIG. 12B (plus or minus 5% around a value corresponding to the target axial offset). The target axial offset is assumed to be minus 10% at the beginning of life and 0% at the end of life for explanatory purposes.

Experimental calculations were performed and the results concluded that constant axial offset control is quite acceptable even if the core is operated at the extremes of the delta I band, and thus, guarantees a favorable power distribution when the reactor returns to full power.

In actual operation, it is quite unlikely that the reactor will be operated at this extreme axial offset for six hours which was one of the controlling criteria of the calculations. The delta I band is used such that whenever delta I goes outside the band, the operator is required to take corrective action to put the axial offset at the target value. Thus, even though the reactor is operated at its extreme axial offset deviation for as long as six hours the reactor power capability is still preserved.

The operation with part length control rods has certain advantages over operation without part length control rods such as the ability to provide quick changes in power level and easiness of axial offset control. A disadvantage of this operation is the burnup shadowing caused by the part length rods, which are positioned near the middle of the core during full power operation. Because part length rods act as neutron absorbers the fuel screened by the part length rods depletes at a much lesser rate than the remaining core. This could result in high peaking near the center of the core when the part length rods are withdrawn if extended load operation is performed. Uncovering of this less burnt fuel when the part length rods are withdrawn is known as "burnup shadowing". It has been observed from experimental calculations that from 50 to 60% part length depletion does not create a large penalty in the radial flux peaking factor. Therefore, in accordance with the operating procedures of this invention it is recommended that the use of part length control rods be limited to 60% during every thirty full power days.

Based on the basic physics studies mentioned above, plant operating instructions are presented below. Instructions for operation with or without part length control rods and procedures for transition between operation with part length rods and operation without part length rods are specifically set forth. Each of the individual steps has as its underlying basis the inventive concepts presented above and will be understood if considered with the foregoing explanations.

Accordingly, the two modes of operation previously identified are set forth in the following paragraphs which provide full control through load follow maneuvers. The first embodiment which provides substantially constant axial offset control without the use of the part length control rods will be described as mode A operation while the remaining embodiment described as exemplary of this invention which employs the part length control rods will be referred to as mode B operation. The resulting difference between the two modes as previously explained is the rate at which the core can be brought to full power. These procedures are designed to maintain peaking factors in the core as low as practical so as to minimize power penalties.

RESTRICTIONS COMMON TO BOTH MODE A AND MODE B OPERATIONS

1. The power dependent rod insertion limits on the part length and the full length control rods must be observed at all times.
2. The flux difference extreme limits, which are given as part of the reactor's technical specifications, if any, must be observed at all times.
3. Axial power distribution monitoring system limits, if any exist according to the technical specifications of the reactor, must be observed at all times.
4. Above 90% licensed power flux difference must be maintained approximately within plus or minus 5% of the flux difference corresponding to the target value for the axial offset. Below 90% of license power flux difference should be maintained approximately within the band plus or minus 5% of the flux difference corresponding to the target value axial offset.

ADDITIONAL RESTRICTION FOR MODE A OPERATION

5. The part length control rods must remain withdrawn from the core.

ADDITIONAL RESTRICTION FOR MODE B OPERATION

6. The full length control rods should preferably remain within the prescribed band.

7. Operation in mode B should be limited in accumulated usage to not more than 60% of each one-thousand MWD/MTU (megawatt day metric ton of uranium) of core average burnup.

MODE A PROCEDURE

Initial Conditions:

1. The secondary plant is ready to accept load changes.
2. The full length control rods may be in the automatic or manual mode of operation.
3. The part length control rods are fully withdrawn from the core.
4. The flux difference is in the permitted range (the flux difference being equal to the axial offset multiplied by the fractional power.

INSTRUCTIONS

Upon a plant load reduction, the power of the reactor is reduced and control rod insertion occurs in accordance with the load dependent program for the reactor coolant temperature, where an average coolant temperature control system is used for normal reactor control. Such an average temperature system is described in the patent to C. F. Currey, U.S. Pat. No. 3,423,285, issued Jan. 21, 1969. Flux difference limits should be maintained by boration. In the event that boration cannot be performed rapidly enough to maintain the flux difference within plus or minus five percent of the flux difference target value the period of violation should be kept as short as possible. Deviations lasting less than 1 hour should not have any adverse effect on the ability to meet limits on a subsequent return to high power.

When the plant load reduction is completed the control rods will start moving upwards from the position which maintains the correct flux difference, as a result of the xenon buildup. Start diluting the boron concentration of the reactor coolant to maintain the correct flux difference. The rate of dilution will vary with time according to flux difference requirements.

Upon demand for a plant load increase the control rods will move out to a new position. Further dilution will be required to keep flux difference within limits and to reach the desired power level.

At the higher power level xenon will be decreased and the control rods will insert into the core. The flux difference limits and rod insertion limits must be maintained by boration of the reactor coolant.

After several hours at the high power level the xenon concentration will again begin to increase due to the 6 or 7 hour delay period that it takes radioactive iodine to decay. Slow dilution of the boron concentration will be required to offset the increase in xenon.

The previous steps set forth above are repeated for cyclic load follow. Other forms of load changing may require application of parts of this procedure.

MODE B PROCEDURE

Initial Conditions:

1. The secondary plant is ready to accept load changes.
2. The full length control rods are positioned in the prescribed band. It is recommended that they be placed in automatic operation.
3. The part length control rods are inserted.
4. The flux difference is in the permitted range.

INSTRUCTIONS:

Upon a plant load reduction, the power of the reactor is reduced and control rod insertion occurs in accordance with the load dependent program for reactor coolant temperature. Flux difference limits should be maintained by manual operation of the part length rods without violation of the part length rod insertion limits. The full length rods should remain automatically within the prescribed band of operation, however; small boron concentration adjustments (dilution or boration) may be required to insure compliance.

When the plant load reduction is completed, or sooner if the load reduction was performed slowly, the full length control rods will start moving upwards from the required position as a result of xenon buildup. Adjust the boron concentration to maintain compliance with the insertion band of the full length rods.

Maintain flux difference within the desired range by the movement of the part length control rods. If the part length rods reach their insertion limits and flux difference cannot be kept within the limits prescribed, the period of the violation should be kept as short as possible and the amount of violation as small as possible. If the period of violation continues for an extended period the full length rods should be adjusted to correct the flux differences.

Upon demand for plant load increase the full length control rods will move out to a new position. Flux difference is maintained by manual operation of the part length control rods.

At the higher power level xenon will decrease and the full length control rods will move into the core. The full length control rods are maintained within the specified band of operation by suitable boration.

After several hours at the high power levels xenon will again begin to increase and slow dilution of the moderator will be required.

The previous steps should be repeated for cyclic load follow. Other forms of load changes may require application of parts of this procedure.

PROCEDURE FOR TRANSITION FROM MODE A TO MODE B

Initial Conditions:

SAME AS MODE A ABOVE

INSTRUCTIONS:

If a plant power reduction below approximately 80% of full power is planned the part length control rod insertion can be initiated when the power level is below approximately 80% and the part length rod insertion will cause the full length control rods to adjust reactivity. During this maneuver it is expected that the flux difference restriction of being within plus or minus 5% of the target value will be violated, so the insertion to the appropriate position for compliance with mode B restrictions should be accomplished as rapidly as possible. If the desired plant power level is above 50%, dilution may be required to stabilize the core in the mode B condition.

If no plant power reduction is planned then the transition can only be accomplished by a forced reduction in power. At high power levels dilution will be required to bring the part length control rods in and to return to full power. Again, flux difference restrictions of being within plus or minus 5% of the value corresponding to the target axial offset should be violated for as short a period as possible, preferably less than one hour.

PROCEDURE FOR TRANSITION FROM MODE B TO MODE A

Initial Conditions:

THE SAME AS FOR MODE B OPERATION.

INSTRUCTIONS:

When the core is operating at less than 80% power then withdrawal of the part length control rods can be accomplished by dilution if necessary while moving the part length rods from a position low in the core to the center of the core, followed by boration as the part length rods are fully withdrawn.

In this maneuver, since the motion of the part length control rods will alter the flux difference, extreme flux limits must be met either by operating at sufficiently low power or by adjusting the full length control rod position through changes in boration concentration. This latter option requires dilution and boration through the maneuver.

Accordingly, this invention provides an improved procedure for operating a nuclear reactor that provides substantially symmetric axial xenon distribution during reactor operation including load follow. The desired xenon distribution is accomplished by maintaining a relatively uniform axial power distribution during load follow maneuvers, which in essence minimizes total peaking factors and thus avoids power penalties. Furthermore, operating within the specified limits prescribed by the steps of this invention simplifies nuclear analysis procedures, minimizes pellet clad interaction effects and reduces the probability of hitting plant alarm limits which can interrupt plant operation. Thus, implementing the procedures set forth above will enable more efficient use of reactor facilities.

I claim as my invention:

1. A method of operating a nuclear reactor having a reactive core including fissile material with an axial dimension and adjustable control means for controlling the reactivity within the core, comprising the steps of:
    monitoring a parameter representative of the power generated within the core at a first and second axial location;
    obtaining from the core power parameters measured at said first and second axial locations a representation of the axial power distribution within the core; and
    adjusting the control means to produce an axial power distribution to maintain a uniform and symmetric xenon distribution above and below substantially the center of the core over a substantial axial length of the core during normal reactor operation including load follow.

2. The method of claim 1 wherein the core is divided axially into upper and lower halves corresponding to said first and second monitored locations.

3. The method of claim 2 wherein the representation of the axial power distribution corresponds to the axial offset of the core.

4. The method of claim 3 wherein the adjusting step activates the control means to maintain the axial offset substantially equal to a predetermined target value throughout reactor operation including changes in reactor power.

5. The method of claim 4 wherein the control means includes control rods and the target value is obtained from the step of determining the axial offset at full power with equilibrium xenon and all control rods removed from the fuel region of the core.

6. The method of claim 4 wherein the target value is determined periodically.

7. The method of claim 6 wherein the interval between the determination of the target value is substantially equal to an equivalent full power month.

8. The method of claim 4 wherein the axial power distribution can vary during reactor operation to have a flux difference within a band of approximately plus or minus 5 percent of a predetermined value for the flux difference corresponding to the target value of the axial offset.

9. The method of claim 1 wherein the control means includes a plurality of elongated control rods comprising neutron absorbing material which are axially aligned with the core along the longitudinal control rod dimension and longitudinally movable into and out of the core with the longitudinal length of the rods at least substantially equal to the axis length of the core and a core cooling medium or moderator having a controlled variable concentration of a neutron absorbing element.

10. The method of claim 9 wherein the changes in reactor power are in part controlled to a desired level by variation of the concentration of the neutron absorbing element and wherein said adjusting step positions the control rods to maintain the substantially symmetric axial power distribution.

11. The method of claim 10 wherein the movement of the control rods within the core are approximately linearly proportional to changes in the power output of the core.

12. The method of claim 9 wherein the control means includes part length elongated control rods comprising neutron absorbing material which are axially aligned with the core along the longitudinal dimension and longitudinally movable within the core with the longitudinal length of the part length rods substantially less than the axial length of the core, wherein the control rods are adjusted for the reactivity control associated with changes in core power output and the adjusting step positions the part length rods to maintain the substantially symmetric axial power distribution.

13. The method of claim 12 wherein as a byproduct of the fission reaction of the fissile material the element xenon is created within the core having a neutron absorption property and wherein said adjusting step controls the concentration of the neutron absorbing element within the core to control the reactivity change due to xenon buildup or depletion corresponding to and associated with changes in core power output.

14. The method of claim 12 wherein the part length rod neutron absorbing capability is substantially equal to the control rod absorption capability of equivalent length.

15. The method of claim 12 wherein said adjusting step employs the part length rods for axial power distribution control for a power operating period approximately equal to less than 60 percent of every 30 equivalent full power days.

16. The method of claim 12 wherein the part length rods are inserted to a distance of approximately 30 percent from the bottom of the core at full power operation and the insertion linearly increases to approximately 10% from the bottom of the core at 50 percent core power.

* * * * *